United States Patent [19]

Asano

[11] 4,217,381

[45] Aug. 12, 1980

[54] LEATHER-LIKE SHEET MATERIAL COMPRISING A URETHANE ELASTOMER PRODUCED FROM POLYDIPROPYLENE ADIPATE AND THE PROCESS OF PRODUCING SAID MATERIAL

[75] Inventor: Koin Asano, Takatsuki, Japan

[73] Assignee: Kanebo Ltd., Tokyo, Japan

[21] Appl. No.: 962,184

[22] Filed: Nov. 20, 1978

Related U.S. Application Data

[63] Continuation of Ser. No. 425,978, Dec. 19, 1973, abandoned.

[30] Foreign Application Priority Data

Dec. 28, 1972 [JP] Japan .................................. 48-1648

[51] Int. Cl.² .......................... B05D 3/10; B32B 5/24; B32B 27/12; B32B 27/40

[52] U.S. Cl. .................................. 427/340; 427/341; 427/342; 427/353; 428/423.1; 428/904

[58] Field of Search ............... 427/340, 341, 342, 353; 428/425, 904

[56] References Cited

U.S. PATENT DOCUMENTS

3,664,979  5/1972  Tanomura et al. .................. 427/354

*Primary Examiner*—James C. Cannon
*Attorney, Agent, or Firm*—Bierman & Bierman

[57] ABSTRACT

A simulated leather element comprising a surface sheet and a base, the sheet containing a polyurethane elastomer produced from a polyol comprising at least 50% by weight of polydipropylene adipate, an organic diisocyanate and a chain extending agent. A method of producing such an element is also disclosed.

12 Claims, No Drawings

LEATHER-LIKE SHEET MATERIAL COMPRISING A URETHANE ELASTOMER PRODUCED FROM POLYDIPROPYLENE ADIPATE AND THE PROCESS OF PRODUCING SAID MATERIAL

This application is a continuation of Ser. No. 425,978, filed Dec. 19, 1973, and now abandoned, which, in turn, claims the priority of Japanese Application No. 1648/73, filed Dec. 28, 1972.

This invention relates to a leather-like sheet material excellent in the cold-proofness and resistance to hydrolysis and a process for producing the same.

It is well known that a porous sheet material of a polyurethane elastomer (usually as nited with a woven or nonwoven fabric base material) is useful as a substitute for leathers.

In producing such artificial sheet materials, it has been conventional to use a polyurethane elastomer containing a polyester or polyether component as the soft segment. However, a conventional polyurethane elastomer prepared by the use of a polyether as the soft segment has a disadvantage that a microporous structure layer can not be easily formed by a wet-cogulating process. On the other hand, a conventional polyurethane elastomer prepared by the use of a polyester as the soft segment has a disadvantage that, though a microporous structure can be comparatively easily formed by a wet-coagulating process, the polyester component is so likely to be hydrolyzed (particularly in the presence of an alkali) that, due to the hydrolysis of the polyester, the polymer molecule will break. As a result the physical properties of the product such as the strength and elongation will be reduced and the durability will become low. Further, a porous sheet made of a conventional polyester type polyurethane elastomer is likely to crack at a low temperature (e.g. $-20°$ C.).

An object of the present invention is to provide a leather-like sheet material excellent in the cold-proofness and resistance to hydrolysis and high in the moisture-permeability.

The other objects of this invention will become apparent from the following description.

Briefly, according to the present invention, there is provided a leather-like sheet material high in the durability and having a microporous structure layer of a polyurethane elastomer produced from a polyol consisting of or containing at least 50% by weight of polydipropylene adipate, an organic diisocyanate and a chain extending atent.

Thus the important novel feature of this invention is in the use of polydipropylene adipate as a substantial component of the polyol for the production of polyurethane elastomers. In the other respects the present invention can be conducted in a manner and with materials well known in the art of producing polyurethane elastomer sheet materials as artificial leathers.

Thus, for example, such sheet material can be obtained by dipping and coagulating a layer of a solution of the above mentioned polyurethane elastomer in a liquid (coagulating liquid) which is a nonsolvent for the polyurethane elastomer but is miscible with the solvent in said solution.

The polyol to be used in this invention is polydipropylene adipate or a polyol containing polydipropylene adipate by substantially at least 50%, the balance being another polyester diol or polyether diol.

The polyol to be used as mixed with polydipropylene adipate is a polyetherdiol (polyether type diol) or polyesterdiol (polyester type diol). The most preferable is a polyesterdiol. For the polyesterdiol, there can be enumerated, for example, a polyethylene adipate, polypropylene adipate, polybutylene (1,4) adipate, polydiethylene adipate and polycaprolactone.

Such polyesterdiol is preferably of a molecular weight of 500 to 3000.

For the polyetherdiol, there can be enumerated such polyalkylene ether glycols as, polyethylene ether glycol, polypropylene ether glycol, polytetramethylene ether glycol and polyhexamethylene ether glycol.

For the organic diisocyanate, there can be used aromatic diisocyanates and alicyclic diisocyanates, for example, tolylene diisocyanate, 4,4'-diphenylmethane diisocyanate, phenylene diisocyanate, 1,5-naphthylene diisocyanate, tetramethylene diisocyanate and 4,4'-dodecahydrodiphenylmethane diisocyanate.

The chain extending agent is an organic compound having two active hydrogen atoms (as determined by Zerewitinoff's method). Examples of such organic chain extending agents are glycols such as ethylene glycol, 1,2-propylene glycol, 1,3-propylene glycol, 1,4-butylene glycol and 1,4-cyclohexane glycol, hydrazine and diamines such as ethylene diamine, 1,2-propylene diamine and m-tolylene diamine.

The polyurethane elastomer of the present invention may be produced by such known polymerizing process as a bulk-polymerization, slurry-polymerization or solution-polymerization, r a prepolymer process or one-step process (one-shot process) depending on the manner of adding the raw material.

The amount of the organic diisocyanate to be used is in a range of 2 to 5 mols per mol of the total polyol, and a chain extending agent is used in a substantial equivalent to 1 to 4 mols of the remaining isocyanate groups. In any of the prepolymer process and one-shot process, the mol ratio of the OH component (the amino component is also equivalent (chemical equivalent) to the total NCO is preferably in a range of 1:0.9 to 1.1.

The solvent to be used in the case of solution-polymerization is a solvent for the polyurethane elastomer to be produced. There can be enumerated, for example, dioxane, tetrahydrofuran, acetone, N,N'-dimethyl formamide, N,N'-dimethylacetamide and dimethyl sulfoxide.

The solution of the polyurethane elastomer to be used in the present invention for coagulation, there can be added, if desired, various additives such as pigment, activator and stabilizer, other polymer such as polyvinyl chloride, polyvinyl acetate and polyacrylic ester and coagulation adjusting agent such as thiourea, urea, sodium chloride, sodium sulfate or ammonium sulfate.

For the coagulating liquid to wet-coagulate the solution of the polyurethane elastomer, there is used a nonsolvent for the polyurethane elastomer, but water, an aqueous solution of an inorganic salt and an aqueous solution of N,N'-dimethyl formamide are particularly preferable. The temperature of the coagulating bath is usually $20°$ to $60°$ C.

The leather-like sheet material of the present invention may be obtained by applying the above mentioned polyurethane elastomer solution to a film making plate or a fibrous base material (such as nonwoven fabric, mat, woven fabric or knit fabric) by coating, impregnation or spraying, and then dipping the same in a coagulating bath for the coagulation of the applied polymer solution layer in a uniform microporous structure. The coagulated sheet material is then washed with water and dried.

The thus obtained sheet material has a uniform microporous structure layer of the above mentioned polyurethane elastomer and has not only a high moisture-permeability, gas-permeability and softness but also the following characteristics:

First of all, one of the characteristics of the sheet material of the invention is that it does not lose the softness even at a low temperature and is remarkably high in the cold-proofness. That is to say, the above mentioned polyurethane elastomer prepared by the use of polyol consisting of or containing at least 50% by weight of polydipropylene adipate has a high resistance against bending crack even at $-20°$ C. and will not lose the softness or will not crack at all even at $-30°$ C.

It is surprising that such excellent cold-proofness is realized only in the use of a polyurethane elastomer derived from a polyol consisting of or containing at least 50% by weight of polydipropylene adipate, in view of the fact that a polyurethane elastomer obtained in the same manner by the use of polyethylene adipate, polydiethylene adipate or polypropylene adipate which is similar in the chemical structure to polydipropylene adipate has no such cold-proofness.

It is believed that this remarkable characteristic is caused by side chain methyl groups present in the dipropylene chain, and particularly because the steric irregularity and steric hindrance are imparted to the polymer by the side chain methyl groups to prevent the crystallization or to lower the freezing temperature of the molecule.

Another important characteristic of the sheet material of this invention is in the remarkably high resistance to hydrolysis. Generally, a polyester type polyurethane has drawbacks that, in case it is placed under an alkaline condition, its hydrolysis is remarkably accelerated. As a result the molecular weight of the polymer is reduced, and the strength and crack resistance are lowered.

For example, a porous polyurethane film prepared in the same manner except that polyethylene adipate is used instead of polydipropylene adipate used in the present invention is low in the alkaliresistance and will deteriorate when dipped in an artificial sweat liquid for 100 hours. However, the porous film of the polyurethane of the present invention is stable and does not change even under such condition.

It is thus obvious that this peculiarity in the properties of the material of this invention is caused evidently by the methyl group side chain present in the dipropylene chain. The effect is caused by the fact that the methyl group side chain of a large molecular capacity and high hydrophobicity will cover the adjacent ester linkage to prevent the approach of a hydrolyzing agent such as OH ions.

As described above, the leather-like sheet material of the present invention has a uniform microporous structure (sponge structure), is high in the moisture-permeability, gas-permeability and softness, is remarkably excellent in the cold-proofness and alkali-resistance and is therefore very useful for not only insteps and linings of shoes but also clothings such as cold weather clothings and coats.

The invention will be explained more concretely with reference to the following examples in which the parts and % are by weight. The cold-proofness, alkali-resistance and moisture-permeability are determined as follows:

(1) Cold-proofness (JIS-6545)

A porous film was bent and the bent portion was kept at $-30\pm1°$ C. in a dry ice atmosphere and was repeatedly bent 50,000 times. The sample in which the microporous layer did not crack was evaluated as passed the test. The passed one was shown by the number of times of bending at which it cracked by checking whether cracks were present every 10,000 times of bending. The one which cracked was shown by the number of bending times at such time.

(2) Alkali-resistance

An artificial sweat liquid containing 10 g. of table salt, 4 g. of ammonium carbonate and 2.5 g. of secondary sodium phosphate in 1000 c.c. of water was prepared and kept at 60° C. A synthetic leather sample was dipped in said liquid under a tension of 20% for 100 hours so as to be deteriorated. Then, the sample was taken out, water-washed and air-dried, was repeatedly bent 200,000 times at 20° C. according to the method of JIS-K-6545. The sample which did not crack in the microporous layer was evaluated as passed the test. The one which cracked was shown by the number of bending times at that time.

(3) Moisture-permeability

The moisture-permeability (mg./cm.$^2$/hr.) was measured by the method of JIS-6549.

EXAMPLE 1

(A) Production of polydipropylene adipate and polyethylene adipate 146 parts of adipic acid and 146 parts of dipropylene glycol were put into a condensation reactor provided with an agitator made of stainless steel, thermometer, nitrogen gas inlet and exhaust gas outlet. The air in the system was replaced with nitrogen, the content in the reactor was gradually heated to 160° C. and the mixture was uniformly agitated and dissolved.

Then the temperature was elevated to 220° C. in 2 hours. The water formed by the condensation reaction was removed and the polycondensation was further conducted under a reduced pressure of 10 to 15 mmhg for 34 hours. The obtained polydipropylene adipate had an OH value of 57.0, acid value of 0.85 and number-average molecular weight of 1940.

On the other hand, by the same reaction as mentioned above except using 146 parts of adipic acid and 71 parts of ethylene glycol or 146 parts of adipic acid and 120 parts of diethyl glycol, there was obtained polyethylene adipate or polydiethylene adipate of an OH value of 57.4, acid value of 0.45 and number-average molecular weight of 1940.

(B) Production of a polyurethane elastomer 49.5 parts of each of the above prepared polydipropylene adipate, polyethylene adipate and polydiethylene adipate (Nos. 1, 7 and 8 in Table 1) or a mixture of the polydipropylene adipate and polyethylene adipate (Nos. 2 to 6 in Table 1), 30.0 parts of 4,4'-diphenylmethane diisocyanate, 8.3 parts of 1,4'-butylene glycol and 160 parts of dimethyl formamide were added into the above mentioned reactor and were polymerized at 50° C. for 8 hours while being agitated and then 0.3 part of ethanol amine was added as a chain extension terminator to obtain polyurethane solution.

Each of the thus obtained weight kinds (mentioned in the later indicated Table 1) of polyurethane solutions was of a solid content of 35.4% and viscosity of 80,000 to 82,000 cps. at 30° C.

(C) Production of synthetic leather

A coating solution prepared by mixing 1% titanium oxide and 5% calcium carbonate in each of the above prepared eight kinds of polyurethane solutions was applied to be 1.0 mm. thick on a nonwoven fabric (thickness: 1.20 mm.) of nylon impregnated with a styrene-butadiene copolymer. The coated sheet material was dipped for 30 minutes in a mixed solution (coagulating liquid) consisting of N,N'-dimethyl formamide and water at a ratio of 60:40 at 40 C. so as to coagulate the polyurethane layer. The resulting sheet was well washed with water to have the remaining solvent removed and was dried with hot air at 80° C.

The cold-proofness and alkali resistance of each of the thus obtained synthetic leathers (thickness: 1.6mm.) were tested.

The cold-proofness, alkali resistance and moisture-permeability of those porous sheets obtained by varying the proportions of polydipropylene adipate and polyethylene adipate are shown in Table 1.

Table 1

| No. | Content of polydipropylene adipate (%) | Cold-proofness | Alkali resistance | Polyol used | Moisture permeability |
|---|---|---|---|---|---|
| 1 | 100 | Passed (200,000 times) | Passed (500,000 times) | Polypropylene adipate alone | 7.7 7.7 |
| 2 | 80 | Passed (180,000 times) | Passed (450,000 times) | | 7.6 |
| 3 | 60 | Passed (130,000 times) | Passed (360,000 times) | Mixture with polyethylene adipate | 7.5 |
| 4 | 50 | Passed (70,000 times) | Passed (290,000 times) | | 7.4 |
| 5 | 45 | Passed (50,000 times) | 120,000 times (not passed) | | 7.4 |
| 6 | 20 | 25,000 times (not passed) | 45,000 times (not passed) | | 7.5 |
| 7 | 0 | 6,000 times (not passed) | 8,000 times (not passed) | Polyethylene adipate alone | 3.7 |
| 8 | 0 | 38,000 times (not passed) | 170,000 times (not passed) | Polyethylene adipate alone | 4.1 |

From the above it will be noted that, if the polydipropylene adipate is contained by more than 50% by weight in the polyol (mixture with the polyethylene adipate), the cold-proofness, alkali resistance and moisture-permeability are improved.

It will also be noted that the product derived from the use of polydiethylene adipate alone chemically similar to the polydipropylene adipate is low in both cold-proofness and alkali resistance.

(D) Durability test for shoes

The synthetic leather of each of Nos. 4 and 5 in Table 1 was finished on the surface with a top coating agent and then shoes were made of it and were tested by wearing.

The test was conducted for 6 months from October 1 to March 31. Fine cracks were observed on substantially all the surfaces of the shoes made of the synthetic leather of No. 5 but no change was recognized on the surfaces of the shoes of No. 4.

EXAMPLE 2

The cold-proofness, alkali resistance and moisture-permeability of a synthetic leather produced in the same manner from a polyurethane elastomer produced in exactly the same manner as in Example 1 except that polytetramethylene ether glycol of a number average molecular weight of 1940 (a mixture with polydipropylene adipate) was used instead of the polyethylene adipate were investigated.

The results are shown in Table 2.

Table 2

| No. | Content of polydipropylene adipate (%) | Cold-proofness | Alkali resistance | Remarks | Moisture-permeability |
|---|---|---|---|---|---|
| 1 | 100 | Passed (200,000 times) | Passed (500,000 times) | Uniform microporous layers were formed. | 7.5 |
| 2 | 80 | Passed (170,000 times) | Passed (500,000 times) | | 7.4 |
| 3 | 60 | Passed (110,000 times) | Passed (500,000 times) | | 7.3 |
| 4 | 50 | Passed (80,000 times) | 480,000 times | | 7.3 |
| 5 | 45 | Passed (70,000 times) | Passed (440,000 times) | Non-uniform microporous layers were formed. | 3.0 |
| 6 | 20 | Passed (160,000 times) | Passed (500,000 times) | | 2.5 |
| 7 | 0 | Passed (220,000 times) | Passed (500,000 times) | | 2.2 |

Although a polyurethane elastomer derived from the use of polyol containing polytetramethylene ether glycol alone (No. 7 in Table 2) or containing 55% or 88% polytetramethylene ether glycol (Nos. 5 and 6 in Table 2) was carefully water-washed for 10 hours after the wet-coagulation, a small amount of the solvent (dimethyl formamide) remained in the porous film. Further, the surface of the dried porous film was irregular and the pores were nonuniform.

In contrast, when the polydipropylene adipate was used as mixed by more than 50% (Nos. 1 to 4 in Table 2) with the water-washing for 4 hours, the dimethyl formamide was well removed and, when dried in the same manner, the pores in the resulting porous film were uniform and nothing wrong was recognized at all. It was also confirmed that these products had excellent cold-proofness, alkali resistance and moisture-permeability.

Further, as a control for this example, a synthetic leather was prepared from a polyurethane produced in the same manner except that polydiethylene adipate was used instead of the polydipropylene adipate in each of Nos. 1 to 4 in Table 2. In each case, with the water-washing for 5 hours, the dimethyl formamide could be removed and a uniform microporous layer was formed but, in the cold-proofness, the product derived from the use of polydiethylene adipate cracked at 38,000 times of bending. As for the alkali resistance, each product was cracked at 120,000 times of bending and was not passed in the test.

EXAMPLE 3

A polyurethane elastomer was prepared in the same manner as in Example 1 by using a mixture of 50% by weight of polydipropylene glycol adipate and 50% by weight of each polyol indicated in Table 3 instead of the polyol mixture of No. 4 indicated in the above Table 1, and a synthetic leather was prepared therefrom in the same manner. The results are shown in Table 3.

Table 3

| No. | Polyol mixed with polydipropylene adipate | Cold-proofness | Alkali resistance | Moisture-permeability |
|---|---|---|---|---|
| 1 | Polypropylene adipate | Passed (70,000 times) | Passed (260,000 times) | 7.2 |
| 2 | Poly-1,4-butylene adipate | Passed (120,000 times) | Passed (320,000 times) | 6.8 |
| 3 | Poly-1,6-hexylene adipate | Passed (190,000 times) | Passed (480,000 times) | 6.4 |
| 4 | Polydiethylene adipate | Passed (140,000 times) | Passed (340,000 times) | 7.0 |
| 5 | Poly-ε-caprolactone | Passed (100,000 times) | Passed (290,000 times) | 6.3 |

EXAMPLE 4

A polyurethane elastomer solution was produced in the same manner as in Example 1 (No. 1 in Table 1) except that the required amount of each polydipropylene adipate different in the molecular weight shown in Table 4 was used for the polydipropylene adipate (the solid concentration was adjusted with dimethyl formamide so as to be 35%). Then a synthetic leather was produced therefrom under the same conditions as (C) in Example 1. The results are shown in Table 4.

Table 4

| | Polydipropylene adipate | | | | | Moisture |
|---|---|---|---|---|---|---|
| No. | Molecular weight | OH value | Acid value | Amount (parts) | Cold-proofness | Alkali resistance | permeability |
| 1 | 500 | 199.1 | 0.9 | 20.2 | Passed (55,000 times) | Passed (260,000 times) | 7.1 |
| 2 | 1000 | 110.5 | 0.5 | 25.2 | Passed (70,000 times) | Passed (350,000 times) | 6.8 |
| 3 | 1500 | 74.0 | 0.6 | 38.2 | Passed (120,000 times) | Passed (460.000 times) | 6.5 |
| 4 | 2000 | 55.4 | 0.6 | 49.5 | Passed (160,000 times) | Passed (500,000 times) | 6.2 |
| 5 | 2500 | 44.0 | 0.8 | 58.5 | Passed (160,000 times) | Passed (390,000 times) | 4.8 |
| 6 | 3000 | 36.6 | 0.7 | 60.6 | Passed (180,000 times) | Passed (230,000 times) | 2.1 |

It will be noted from the above that the molecular weight of the polydipropylene adipate is preferably 500 to 2500, most preferably 1000 to 2000.

EXAMPLE 5

Each synthetic leather was produced in the same manner as in Example 1 except that a solution of the polyurethane elastomer (derived from the use of a mixed polyol of 50% polydipropylene adipate ans 50% polyethylene adipate) of No. 4 in Table 1 in Example 1 was coagulated in a coagulating bath (consisting of water alone or an aqueous solution of sodium sulfate) shown in Table 5. Shoes were experimentally made of such synthetic leather and were tested by wearing for 6 months in the same manner as in (D) in Example 1. The results are shown in Table 5.

Table 5

| Coagulating bath | Cross-sectioned structure of microporous film | Cold-proofness | Alkali resistance | Result after wearing for 6 months | Moisture-permeability |
|---|---|---|---|---|---|
| Water (at 30° C.) | Uniformly microporous | Passed (70,000 times) | Passed (290,000 times) | Nothing wrong | 6.1 |
| Sodium sulfate (250 g./liter of water) | Uniformly Microporous | Passed (70,000 times) | Passed (290,000 times) | Nothing wrong | 8.9 |

From the above, it will be noted that, even if water alone or an aqueous solution of an inorganic salt is used for the coagulating bath, a porous sheet high in the cold-proofness and alkali resistance can be obtained. Further, in the case of using an aqueous solution of an inorganic salt for the coagulating bath, a porous sheet higher in the moisture-permeability will be obtain.

EXAMPLE 6

(1) Production of polyurethane elastomer by prepolymer process 49.5 parts of polydipropylene adipate and 30.0 parts of 4,4-diphenylmethane diisocyanate used in Example 1 were put into a polymerization reactor and were made to react while being agitated at 180° C. for 120 minutes in a nitrogen gas atmosphere to produce a prepolymer having an NCO group at each terminal of the molecule. Then this prepolymer was cooled to 50° C., was dissolved by adding 160 parts of dimethyl formamide and was then made to further polymerize (chain-extending reaction) at 50° C. for 5 hours by adding 8.1 parts of 1,4-butylene glycol. Then the reaction was stopped by adding 0.2 part of ethanolamine to obtain a polyurethane solution (solid content of 35.3% and viscosity of 8,500 cps. at 30° C.).

(2) Production of synthetic leather

A synthetic leather obtained in the same manner as in (C) in Example 1 by using the above mentioned polyurethane solution was high in the cold-proofness (passed with 220,000 times of bending) and alkali resistance (passed with 430,000 times of bending) and showed a high moisture-permeability (7.3 mg./cm$^2$/hr.).

EXAMPLE 7

The polyurethane elastomer solution of each of Nos. 1 to 8 shown in Table 1 in Example 1 was applied to be 1.0 mm. thick on a glass plate, was then dipped in the coagulating liquid of (C) in Example 1 so as to be coagulated and was then water-washed and dried to obtain a microporous film. The results are shown in Table 6.

Table 6

| Polyurethane No. in Table 1 in Example 1 | Cold-proofness | Alkali resistance | Moisture-permeability |
|---|---|---|---|
| 1 | Passed (200,000 times) | Passed (500,000 times) | 12.3 |
| 2 | Passed (180,000 times) | Passed (450,000 times) | 12.0 |
| 3 | Passed (130,000 times) | Passed (360,000 times) | 12.1 |
| 4 | Passed (70,000 times) | Passed (290.000 times) | 12.2 |
| 5 | Passed (50,000 times) | Not passed (120,000 times) | 11.0 |
| 6 | Not Passed (25,000 times) | Not passed (45,000 times) | 11.5 |
| 7 | Not passed (6,000 times) | Not passed (8,000 times) | 4.5 |
| 8 | Not passed (38,000 times) | Not passed (170,000 times) | 6.1 |

As apparent by comparing the results in the above Table 6 with those in Table 1 in Example 1, the cold-proofness and alkali resistance of the porous film obtained by applying the polyurethane solution onto the glass plate and coagulating it were the same as in Example 1 but the moisture-permeability of the porous film in Table 6 was higher.

Control 1

A polyurethane elastomer solution (viscosity 82,000 cps. at 30° C. and solid content 35.2%) was obtained by the same manner as in Example 1 except by using polypropylene adipate (number average molecular weight 1950; OH value 56.9; acid value 0.60) instead of the polydipropylene adipate (of No. 1 in Table 1). A synthetic leather (1.6 mm. thick) was then obtained in the same manner as in (C) in Example 1 by using the above prepared polyurethane elastomer solution. The moisture-permeability was 3.2 mg./cm$^2$/hr., alkali resistance was not passed (with 13,000 times of bending) and cold-proofness was not also passed (with 8,000 times of bending). These properties are remarkably lower than in the case wherein there is used polydipropylene adipate (present invention) as in Example 1 (No. 1 in Table 1).

Control 2

A polyurethane elastomer solution (viscosity 80,000 cps. at 30° C.; solid content 35.3%) was obtained by the same manner as in Example 1 except by using polydipropylene sebacate (number average molecular weight 1970; OH value 56.1; acid value 0.85) instead of polydipropylene adipate (No. 1 in Table 1). A synthetic leather (1.6 mm. thick) obtained therefrom in the same manner as in (C) in Example 1 had a remarkably nonuniform microporous structure and showed a moisture-permeability of a remarkably low value of 1.5 mg./cm$^2$/hr. Further, its cold-proofness and alkali resistance are both passed with 150,000 and 350,000 times of bending, respectively but are recognized to be considerably different from those in the case wherein there is used polydipropylene adipate (No. 1 in Example 1). Such difference in the performance is apparently caused by the difference in the molecular structure of the polyol used.

Control 3

A polyurethane elastomer solution was produced by the same manner as in Example 1 except by using each of the below mentioned copolyesterdiols instead of polydipropylene adipate (alone) (No. 1 in Table 1) and then a synthetic leather was produced therefrom in the same manner. The results are shown in Table 7.

(1) Used copolyesterdiols.
No. 1: Dipropylene glycol (90 mol %) - ethylene glycol (10 mol %) - adipate (acid value 0.65, OH value 57.1).
No. 2: Dipropylene glycol (80 mol %) - 1,4-butylene glycol (20 mol %) - adipate (acid value 0.70, OH value 56.8).
No. 3: Copolyester of dipropylene glycol adipate (80 mol %) and dipropylene glycol 2,5-diethyl adipate.

Table 7

| Copolyesterdiols | | | |
|---|---|---|---|
| No. | Content of dipropylene adipate component (calculated as wt. %) | Cold-proofness | Alkali resistance | Moisture-permeability |
| 1 | 95 | Passed (80,000 times) | Not passed (11,000 times) | 4.7 |
| 2 | 85 | Passed (120,000 times) | Not passed (18,000 times) | 4.5 |
| 3 | 75 | Passed (60,000 times) | Not passed (160,000 times) | 1.3 |

As in the above, the alkali resistance of the leathers derived from the copolyesters (Nos. 1 and 2) consisting of dipropylene glycol, other glycols and adipic acid and from the copolyester (No. 3) consisting of dipropylene glycol, adipic acid and other carboxylic acid is not passed (with less than 200,000 times of bending) and is remarkably lower than in the above mentioned case of using the polydipropylene adipate alone of the present invention (Example 1) and the case of using it together with the other homopolyester (Example 3).

What is claimed is:

1. A process for producing leather-like sheet material consisting essentially of applying a solution of a polyurethane elastomer produced from (1) a polyol component containing at least 50% by weight of polydipropylene adipate, (2) an organic diisocyanate and (3) a chain extending agent onto a film making plate or a fibrous base material for synthetic leathers, then dipping it in a coagulating liquid so as to be coagulated and then water-washing and drying.

2. A process according to claim 1 wherein said diisocyanate is tolylene diisocyanate, 4,4'-diphenylmethane diisocyanate, phenylene diisocyanate, 1,5-naphthylene diisocyanate, hexamethylene diisocyanate or tetramethylene diisocyanate.

3. A process according to claim 1 wherein water, an aqueous solution of an inorganic salt or a mixed solution of N,N-dimethyl formamide and water is used for said coagulating liquid.

4. A process according to claim 3 wherein said chain extending agent is ethylene glycol, 1,2-propylene glycol, 1,3-propylene glycol, 1,4-butylene glycol, 1,4-cyclohexane glycol, hydrazine, ethylene diamine, 1,2-propylene diamine or m-tolylene diamine.

5. A process according to claim 1 wherein the temperature of said coagulating liquid is 20 to 60° C.

6. A process according to claim 1 wherein a solvent for said polyurethane elastomer solution is dioxane, tetrahydrofuran, N,N-dimethyl formamide, N,N-dimethyl acetamide or dimethyl sulfoxide.

7. A process according to claim 1 wherein the said organic diisocyanate is an aromatic diisocyanate, alicyclic diisocyanate or aliphatic diisocyanate.

8. A process according to claim 1 wherein the said chain extending agent is a glycol or diamine.

9. A process according to claim 1 wherein the said fibrous base material for synthetic leathers is a nonwoven fabric, woven fabric, knit fabric or mat.

10. A process according to claim 1 wherein said organic diisocyanate is tolylene diisocyanate, 4,4'-diphenylmethane diisocyanate, phenylene diisocyanate, 1,5-naphthylene diisocyanate, hexamethylene diisocyanate or tetramethylene diisocyanate.

11. A process according to claim 1 wherein said chain extending agent is ethylene glycol, 1,2-propylene glycol, 1,3-propylene glycol, 1,4-butylene glycol, 1,4-cyclohexane glycol, hydrazine, ethylene diamine, 1,2-propylene diamine or m-tolylene diamine.

12. A process according to claim 1 wherein said component comprises less than 50% of a polyethylene ether glycol, polypropylene ether glycol, polytetramethylene ether glycol or a polyhexamethylene ether glycol.

* * * * *